(12) United States Patent
Maruyama et al.

(10) Patent No.: US 12,459,508 B2
(45) Date of Patent: Nov. 4, 2025

(54) DRIVER ASSISTANCE DEVICE

(71) Applicant: SUBARU CORPORATION, Tokyo (JP)

(72) Inventors: Shun Maruyama, Tokyo (JP); Osamu Okada, Tokyo (JP); Atsuhiro Sakaya, Tokyo (JP); Ryosuke Takimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 58 days.

(21) Appl. No.: 18/611,872

(22) Filed: Mar. 21, 2024

(65) Prior Publication Data
US 2024/0326803 A1 Oct. 3, 2024

(30) Foreign Application Priority Data
Mar. 30, 2023 (JP) ................................ 2023-054937

(51) Int. Cl.
*B60W 30/14* (2006.01)
*G01C 21/34* (2006.01)

(52) U.S. Cl.
CPC ....... *B60W 30/143* (2013.01); *G01C 21/3461* (2013.01); *B60W 2556/65* (2020.02)

(58) Field of Classification Search
CPC ........... B60W 30/143; B60W 2556/65; B60W 60/0018; B60W 60/00184; B60W 2552/05; B60W 2720/10; G01C 21/3461
See application file for complete search history.

(56) References Cited

U.S. PATENT DOCUMENTS

| 9,587,952 | B1* | 3/2017 | Slusar | G01C 21/3623 |
| 12,367,686 | B2* | 7/2025 | Zhou | B60W 60/001 |
| 2016/0167652 | A1* | 6/2016 | Slusar | B60W 30/143 |
| | | | | 701/27 |
| 2021/0063179 | A1* | 3/2021 | Hayes | G01C 21/3632 |
| 2021/0138959 | A1* | 5/2021 | Soni | G08G 1/16 |
| 2022/0022789 | A1* | 1/2022 | Kim | A61B 5/165 |
| 2022/0119012 | A1* | 4/2022 | Agon | G06V 20/56 |
| 2023/0083999 | A1* | 3/2023 | Marlett | B60W 50/16 |
| | | | | 701/1 |
| 2024/0278805 | A1* | 8/2024 | Shetiya | B60W 30/09 |
| 2025/0065894 | A1* | 2/2025 | Luo | B60W 50/0205 |

FOREIGN PATENT DOCUMENTS

JP 2008-299758 A 12/2008

* cited by examiner

*Primary Examiner* — Ashley L Redhead, Jr.
(74) *Attorney, Agent, or Firm* — Rimon P.C.

(57) ABSTRACT

A driver assistance device comprises a travel route calculator, a danger zone identifier, an information acquisitor, a speed determiner, and a speed controller. The travel route calculator is configured to calculate a travel route to a destination set by an occupant of a vehicle. The danger zone identifier is configured to identify a danger zone on the travel route. The information acquisitor is configured to acquire, from at least one preceding vehicle traveling ahead on the travel route, travel and road surface information at a time when the preceding vehicle has traveled in the danger zone. The speed determiner is configured to, based on the travel and road surface information, determine a safe-travel speed at which the vehicle can travel in the danger zone safely. The speed controller is configured to control, with the safe-travel speed, a travel speed of the vehicle when the vehicle travels in the danger zone.

7 Claims, 5 Drawing Sheets

|  | CONTENTS |
| --- | --- |
| TRAVELING INFORMATION | VEHICLE IDENTIFICATION INFORMATION (EMERGENCY VEHICLE/SPECIAL VEHICLE IDENTIFICATION INFORMATION) |
|  | TRAVELING LOCATION INFORMATION |
|  | VEHICLE SPEED |
|  | SAFETY DEVICE OPERATION STATUS (OPERATION STATUS OF ANTI-SKID FUNCTION, ETC.) |
|  | OPERATION STATUS OF WIPER/LIGHT, ETC. |
| ROAD SURFACE INFORMATION | VEHICLE FRONT IMAGE INFORMATION/ROAD SURFACE IMAGE INFORMATION |

Fig. 2

DRIVER ASSISTANCE DEVICE

CROSS-REFERENCE TO RELATED APPLICATIONS

The present application claims priority from Japanese Patent Application No. 2023-054937 filed on Mar. 30, 2023, the entire contents of which are hereby incorporated by reference.

BACKGROUND

The disclosure relates to a driver assistance device.

In recent years, a vehicle equipped with advanced driver assistance systems (ADAS) functions, in which the vehicle itself ascertains information of its surroundings and controls the vehicle on behalf of a driver who drives the vehicle, has been put to practical use.

For example, as this type of technology, Japanese Unexamined Patent Application Publication (JP-A) No. 2008-299758 discloses a technology that acquires a travel state of a preceding vehicle traveling ahead, to determine a dangerous state of a vehicle, and to control a travel speed of the vehicle, for example.

SUMMARY

Aspect 1: One or more embodiments of the disclosure proposes a driver assistance device comprising a travel route calculator, a danger zone identifier, an information acquisitor, a speed determiner, and a speed controller. The travel route calculator is configured to calculate a travel route to a destination set by an occupant of the vehicle. The danger zone identifier is configured to identify a danger zone on the travel route. The information acquisitor is configured to acquire, from at least one preceding vehicle traveling ahead of the vehicle on the travel route, travel information and road surface information when the at least one preceding vehicle has traveled in the danger zone. The speed determiner is configured to determine, based on the travel information and the road surface information, a safe-travel speed at which the vehicle can travel in the danger zone safely. The speed controller is configured to control, based on the safe-travel speed, a travel speed of the vehicle when the vehicle travels in the danger zone.

Aspect 2: One or more embodiments of the disclosure proposes a driver assistance device comprising one or more processors and one or more memories communicably connected to the one or more processors. The one or more processors configured to: calculate a travel route to a destination set by an occupant of the vehicle; identify a danger zone on the travel route; from at least one preceding vehicle traveling ahead on the travel route, acquire travel information and road surface information at a time when the at least one preceding vehicle has traveled in the danger zone; based on the travel information and the road surface information, determine a safe-travel speed at which the vehicle can travel in the danger zone safely; and based on the safe-travel speed, control a travel speed of the vehicle when the vehicle travels in the danger zone.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 2 illustrates information acquired by an information acquisitor of the driver assistance device according to the embodiment of the disclosure.

DETAILED DESCRIPTION

In the technology described in the above-mentioned JP-A No. 2008-299758, a speed control of a vehicle is performed based on travel information, such as the amount of steering wheel/brake operation and vehicle speed, acquired from a preceding vehicle traveling ahead.

However, the technology described in JP-A No. 2008-299758 does not acquire information on a road surface on which the preceding vehicle is traveling. Therefore, for example, a slipperiness of the road surface on which the preceding vehicle is traveling due to unpaved or frozen conditions cannot be detected, and an accuracy of the speed control of the vehicle deteriorates.

It is desirable to provide a driver assistance device configured to perform a highly accurate speed control based on travel information of a preceding vehicle and road surface information.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 3:
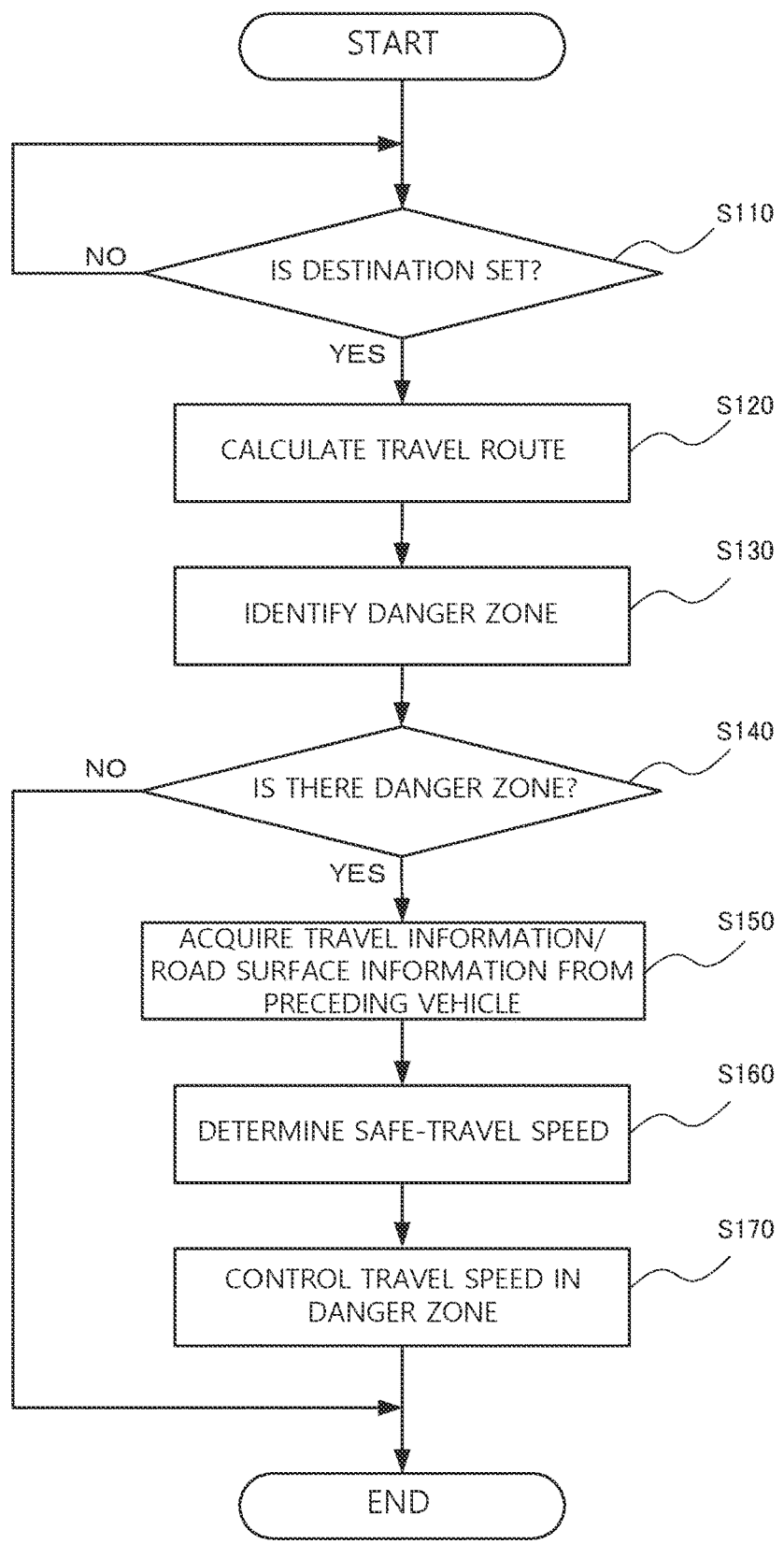
FIG. 3 illustrates a flow of a process of the driver assistance device according to the embodiment of the disclosure.

A driver assistance device 1 according to a first embodiment will be described using FIG. 1 to FIG. 3.

Configuration of Driver Assistance Device 1

Figure 1:
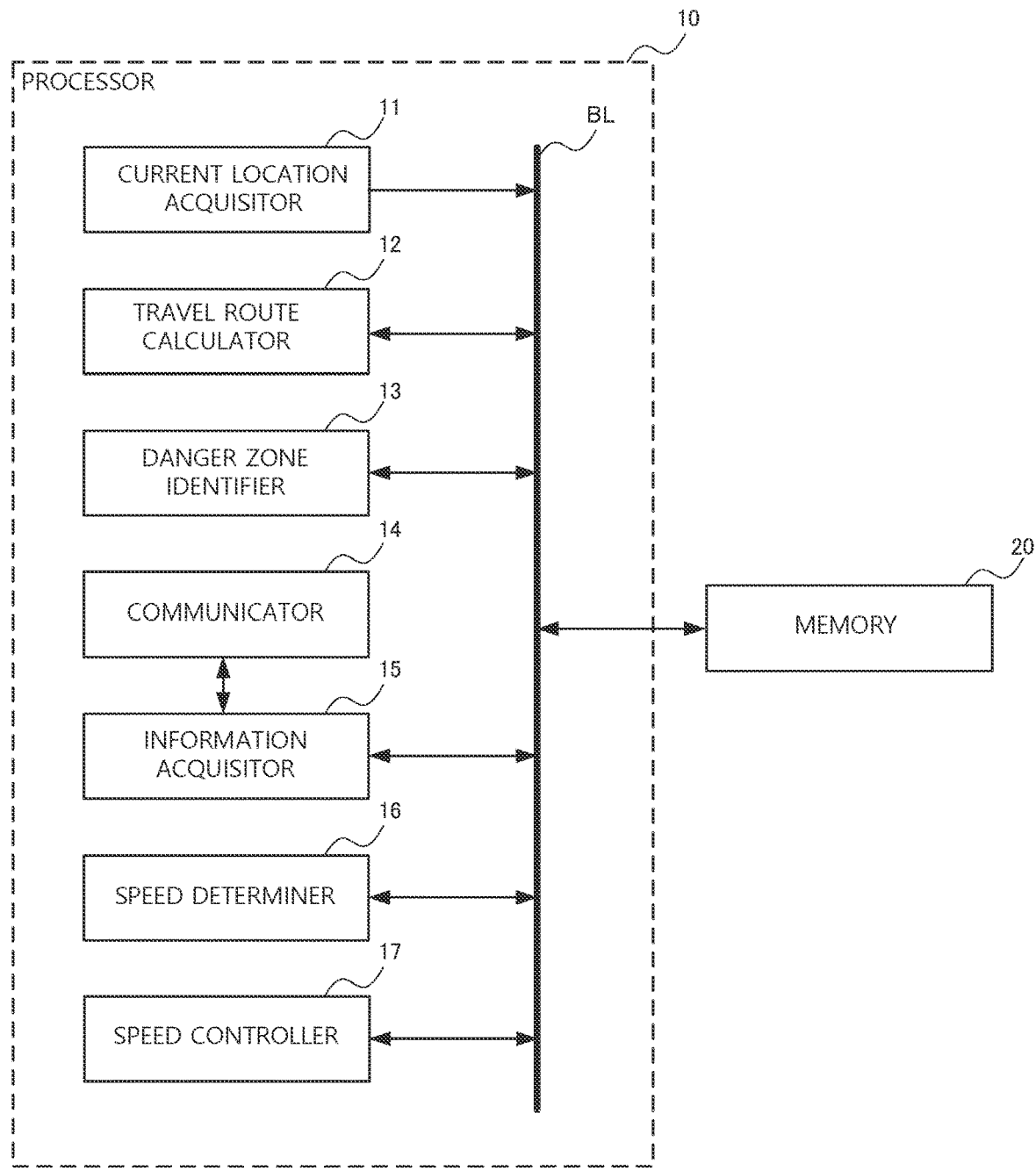
FIG. 1 illustrates a configuration of a driver assistance device according to an embodiment of the disclosure.

As illustrated in FIG. 1, the driver assistance device 1 according to the first embodiment comprises a processor 10 and a memory 20.

The processor 10 controls the entire driver assistance device 1 according to a control program stored in the memory 20.

The details of the processor 10 will be described later.

The memory 20 comprises a read-only memory (ROM), and a random-access memory (RAM). The ROM stores information such as the control program mentioned above, and map information, and the RAM stores various data received from the processor 10.

Configuration of Processor 10

The processor 10 comprises a current location acquisitor 11, a travel route calculator 12, a danger zone identifier 13, a communicator 14, an information acquisitor 15, a speed determiner 16, and a speed controller 17.

The memory 20 and each component of the processor 10 send and receive various types of information via a bus line BL.

The current location acquisitor 11 acquires current location information of a vehicle comprising the driver assistance device 1.

The current location acquisitor 11 acquires a current location of the vehicle based on radio waves received from a global positioning system (GPS) satellite.

The current location acquisitor 11 stores the acquired current location information of the vehicle in the memory 20.

The travel route calculator 12 calculates a travel route to a destination set by an occupant of the vehicle (hereinafter also referred to as "vehicle occupant").

The travel route calculator 12 calculates the travel route from the current location of the vehicle to the destination based on information of the destination set by the vehicle occupant (hereinafter also referred to as "destination information") and the current location information the map information acquired from the memory 20.

The destination information includes facility name, address, latitude and longitude and is acquired, for example, from an unillustrated navigation device installed in the vehicle.

The travel route calculator 12 stores information on the calculated travel route in the memory 20.

The danger zone identifier 13 identifies a danger zone on the travel route.

The danger zone identifier 13 acquires the information on the travel route from the memory 20 and identifies the danger zone on the acquired travel route.

The danger zone is a section of the road that a driver who drives the vehicle is to drive particularly carefully. Examples of the danger zone are a sharp curve, a section with heavy pedestrian traffic, an unpaved road section, a flooded section due to heavy rain, a section where dense fog occurs frequently, a section where the vehicle and an oncoming vehicle have difficulty to pass by each other, and a section where an accident frequently occurs.

The danger zone identifier 13 refers to a danger zone list stored in the memory 20 in advance and the travel route calculated by the travel route calculator 12 to determine whether there is the danger zone on the travel route. The danger zone identifier 13 stores, in the memory 20, identification results of the danger zone that includes, for example, presence or absence of a danger zone and location information on the identified danger zone.

The danger zone identifier 13 may acquire a latest danger zone list which includes information such as an unpaved road section due to construction work being conducted for a specified period of time, from a server connected to an internet network, and identify the danger zone along the travel route.

The communicator 14 is, for example, a wireless communication module for an inter-vehicle communication/roadside-to-vehicle communication. The communicator 14 serves as an interface for the later-described information acquisitor 15 to acquire information from a preceding vehicle traveling ahead of the vehicle on the travel route.

The communicator 14 is the wireless communication module that can be connected to the internet network, and serves as the interface for acquiring information from the server connected to the internet network.

The information acquisitor 15 acquires, from at least one preceding vehicle traveling ahead of the vehicle on the travel route, travel information and road surface information at the time when the at least one preceding vehicle has traveled in the danger zone.

The information acquisitor 15 acquires, via the communicator 14, the travel information and the road surface information at the time when the preceding vehicle has traveled in the danger zone identified by the danger zone identifier 13 from the preceding vehicle traveling in the danger zone.

As illustrated in FIG. 2, examples of the travel information that the information acquisitor 15 acquires from the preceding vehicle include vehicle identification information, travel location information, vehicle speed information, a safety device operation status, and a wiper/light operation status. The safety device operation status is, for example, an operation status of ADAS functions such as anti-skid function.

Examples of the road surface information acquired by the information acquisitor 15 from the preceding vehicle include images of a front of vehicle and a road surface captured by a camera, mounted on the preceding vehicle.

The information acquisitor 15 acquires the travel information and the road surface information of the section where a travel location of the preceding vehicle and the danger zone coincide, and stores the acquired travel and road surface information in the memory 20.

The operation of information acquisitor 15 is not limited to the above, since the information acquisitor 15 simply acquires the travel information and the road surface information from the preceding vehicle that has traveled in the danger zone where the vehicle is scheduled to travel.

For example, the information acquisitor 15 may connect to a server where the travel information and the road surface information received from each traveling vehicle is stored, extract a vehicle that has traveled in the danger zone, and acquire the travel information and the road surface information.

The speed determiner 16 determines a safe-travel speed at which the vehicle can travel in the danger zone safely based on the travel information and the road surface information.

In more detail, the speed determiner 16 determines the safe-travel speed at which the vehicle can travel in the danger zone safely based on the travel information and the road surface information stored in the memory 20, and stores the safe-travel speed in the memory 20.

The speed determiner 16 determines the safe-travel speed based on the travel information and the road surface information acquired from the preceding vehicle other than an emergency vehicle.

In more detail, the speed determiner 16 checks the vehicle identification information of the travel information acquired from the preceding vehicle, and determines the safe-travel speed based on the travel information and the road surface information acquired from the preceding vehicle other than emergency/special vehicles such as ambulances and fire trucks.

Upon determining the safe-travel speed, the speed determiner 16 uses the travel information and the road surface information of the preceding vehicle that has traveled in the danger zone within a predetermined time period before the vehicle reaches the danger zone.

In more detail, the speed determiner 16 determines the safe-travel speed by acquiring the travel information and the road surface information from the preceding vehicle that has traveled in the danger zone during a time period immediately before the vehicle reaches the danger zone.

For example, the speed determiner 16 calculates an expected arrival time of the vehicle at the danger zone, and determines the safe-travel speed based on the travel information and the road surface information of the preceding vehicle that has traveled in the danger zone during a time period back from the expected arrival time for a predetermined time period.

For further example, when the calculated expected arrival time is 10:00 and the predetermined time period is 30 minutes, the speed determiner 16 determines the safe-travel speed based on the travel information and the road surface information of at least one preceding vehicle that traveled the danger zone during the time period from 9:30 to 10:00.

The speed determiner 16, for example, analyzes the road surface information acquired from at least one preceding vehicle to determine a visibility status and road surface conditions in the danger zone. The visibility status may be, for example, occurrence of poor visibility due to dust and the weather such as rainfall, snowfall, and fog. The road surface conditions may be, for example, occurrence of snow accumulation, freezing, and flooding, amount of precipitation, and an unpaved road surface. Then, the speed determiner 16 determines the safe-travel speed based on the determination results and the travel information of the preceding vehicle.

For example, the speed determiner 16 sets a speed of 20 km/h or less as the safe-travel speed when the speed determiner 16 determines that the road surface is freezing as a result of analyzing an image serving as the road surface information and detects a presence of a vehicle with an anti-skid function activated in the acquired travel information.

In another example, the speed determiner 16 determines an average speed of the preceding vehicle with no safety device activated to be the safe-travel speed, when there is no rainfall and the road surface is dry as the result of analyzing the image.

The operation of the speed determiner 16 is not limited to the above, since the speed determiner 16 simply determines the safe-travel speed at which the vehicle can travel safely by combining the travel information and the road surface information acquired from the preceding vehicle traveling in the danger zone.

The speed determiner 16 stores the safe-travel speed in the memory 20.

The speed controller 17 controls, based on the safe-travel speed determined in the speed determiner 16, the travel speed of the vehicle when the vehicle travels in the danger zone.

The speed controller 17 checks the current location information of the vehicle and the location information of the danger zone, controls the travel speed of the vehicle so that when the vehicle enters the danger zone, the travel speed is lower than the safe-travel speed determined by the speed determiner 16. The speed controller 17 continues the speed control until the vehicle passes the danger zone.

The speed controller 17 may propose an execution of the speed control in the danger zone to the driver before the vehicle enters the danger zone, and, when the driver agrees to the execution of the speed control, the speed control of the vehicle may be performed.

Process of Driver Assistance Device 1

The process of the driver assistance device 1 will be described using FIG. 3.

The processor 10 determines whether the vehicle occupant has set the destination (step S110).

When the processor 10 determines that the vehicle occupant has not set the destination ("NO" in step S110), the process returns to a standby state.

When the processor 10 determines that the vehicle occupant has set the destination ("YES" in step S110), the travel route calculator 12 calculates the travel route from the current location of the vehicle to the destination (step S120), and the process moves to step S130.

The danger zone identifier 13 identifies the danger zone on the travel route calculated in step S120 (step S130), and the process moves to step S140.

The processor 10 determines whether the danger zone has been detected on the travel route by the danger zone identifier 13 (step S140).

When the processor 10 checks the identification results of the danger zone stored in the memory 20 and determines that the danger zone has not been detected by the danger zone identifier 13 ("NO" in step S140), the process is terminated.

When the processor 10 checks the identification results of the danger zone stored in the memory 20 and determines that the danger zone has been detected by the danger zone identifier 13 ("YES" in step S140), the process moves to step S150.

The information acquisitor 15 acquires the travel information and the road surface information from the preceding vehicle traveling ahead on the travel route when traveling in the danger zone (step S150), and the process moves to step S160.

The speed determiner 16 determines the safe-travel speed at which the vehicle can travel in the danger zone safely based on the travel information and the road surface information acquired in step S150 (step S160), and the process moves to step S170.

The speed controller 17 controls the travel speed of the vehicle in the danger zone based on the safe-travel speed determined in step S160 (step S170), and the process is terminated.

Effect

As described above, the processor 10 of the driver assistance device 1 according to the first embodiment comprises the travel route calculator 12, the danger zone identifier 13, the information acquisitor 15, the speed determiner 16, and the speed controller 17. The travel route calculator 12 calculates the travel route to the destination set by the vehicle occupant. The danger zone identifier 13 identifies danger zone on the travel route. The information acquisitor 15 acquires, from at least one preceding vehicle traveling ahead on the travel route, the travel information and the road surface information at the time when the at least one preceding vehicle has traveled in the danger zone. The speed determiner 16 determines the safe-travel speed at which the danger zone can be traveled safely based on the travel information and the road surface information. The speed controller 17 controls, based on the safe-travel speed, the travel speed when the vehicle travels in the danger zone.

In other words, based on the travel information and the road surface information of the preceding vehicle traveling ahead on the travel route, the driver assistance device 1 determines the safe-travel speed at which the vehicle can travel in the danger zone safely and controls a travel speed in the danger zone. Accordingly, the vehicle can travel the danger zone on the travel route to the destination safely.

This allows the driver to travel in the danger zone at ease since the speed control of the vehicle may be performed by determining the safe-travel speed in the danger zone before the vehicle enters the danger zone.

The information acquisitor 15 acquires, from the preceding vehicle, the travel information (vehicle identification information, travel location information, vehicle speed information, safety device operation status, and wiper/light operation status) and the road surface information such as images of the front of vehicle and the road surface.

In other words, the speed determiner 16 executes the analysis of the road surface information acquired from the preceding vehicle to determine the safe-travel speed at which the vehicle can travel in the danger zone safely. For the analysis, the speed determiner 16 ascertains, for example, the visibility status (occurrence of poor visibility due to dust and the weather such as rainfall, snowfall, and fog), and the road surface conditions (occurrence of snow accumulation, freezing, and flooding, and the unpaved road surface), which cannot be ascertained from the travel information.

This allows for a highly accurate speed control based on the travel information and the road surface information of the preceding vehicle, allowing the driver to travel in the danger zone at ease.

The speed determiner 16 of the driver assistance device 1 according to the first embodiment determines the safe-travel speed based on the travel information and the road surface information acquired from the preceding vehicle other than the emergency vehicle.

The travel information including the travel speed of the emergency vehicle such as the ambulance or fire truck may differ significantly from that of other vehicles traveling on the same road. Therefore, the speed determiner 16 determines the safe-travel speed based on the travel information and the road surface information acquired from the preceding vehicle other than the emergency vehicle.

This allows the safe-travel speed at which the vehicle can travel in the danger zone safely to be determined with a high degree of accuracy.

The speed determiner 16 of the driver assistance device 1 according to the first embodiment determines the safe-travel speed based on the travel information and the road surface information of the preceding vehicle that has traveled in the danger zone within the predetermined time period before the vehicle reaches the danger zone.

the road surface conditions change rapidly due to changes in for example, the weather. Thus, the speed determiner 16 uses the travel information and the road surface information of the preceding vehicle that has traveled in the danger zone during the predetermined time period immediately before the vehicle passed through the danger zone to determine the safe-travel speed at which the vehicle can travel in the danger zone safely.

This allows the safe-travel speed at which the vehicle can travel in the danger zone safely to be determined with a high degree of accuracy.

Second Embodiment

A driver assistance device 1A according to a second embodiment will be described using FIG. 4 and FIG. 5.

Detailed descriptions of components the same symbols as in the first embodiment are omitted, since they have the same functions.

Configuration of Driver Assistance Device 1A

Figure 4:
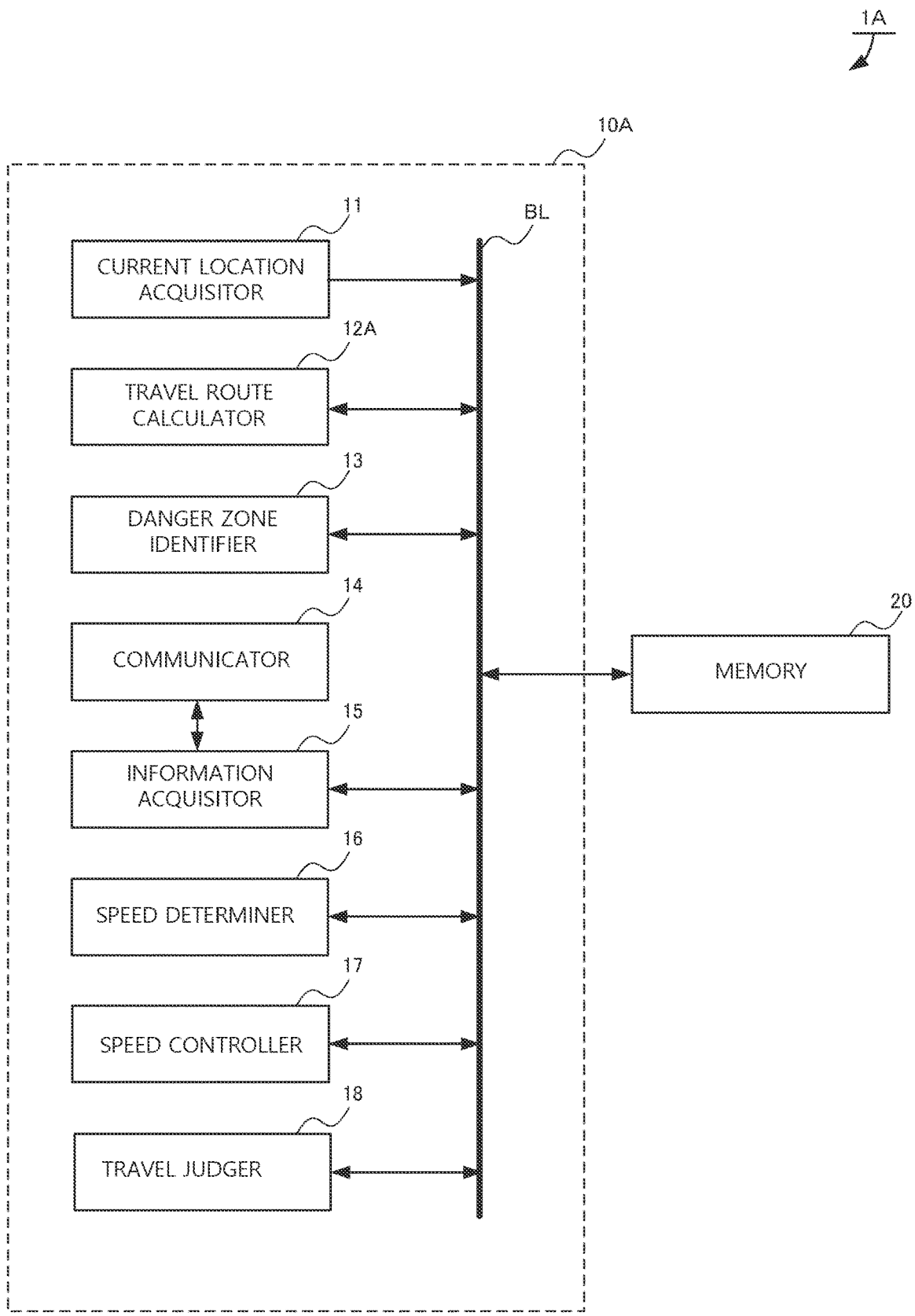
FIG. 4 illustrates a configuration of a driver assistance device according to an embodiment of the disclosure.
Figure 5:
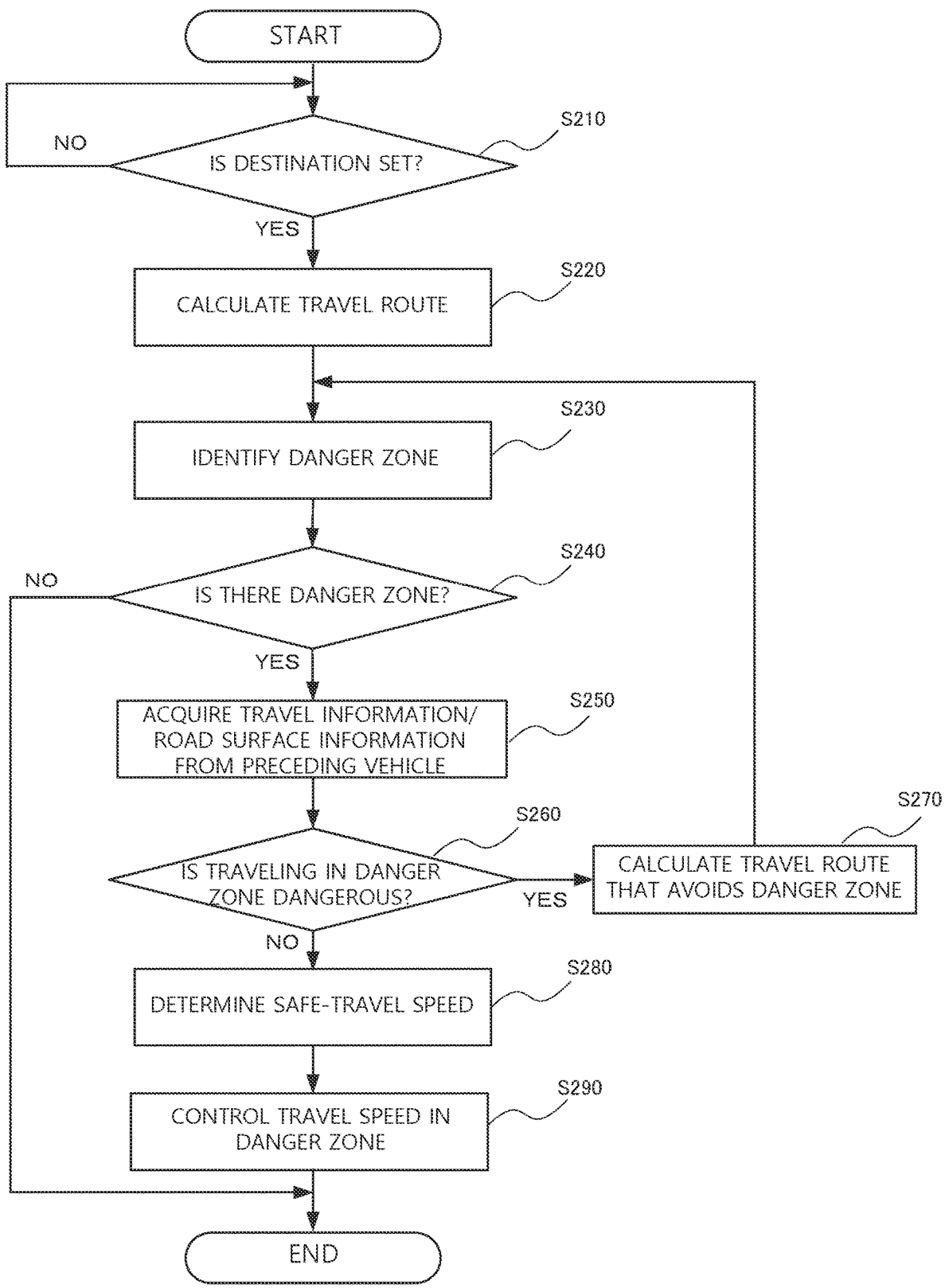
FIG. 5 illustrates a flow of a process of the driver assistance device according to the embodiment of the disclosure.

As illustrated in FIG. 4, the driver assistance device 1A according to the second embodiment comprises a processor 10A and a memory 20.

Configuration of Processor 10A

The processor 10A comprises a current location acquisitor 11, a travel route calculator 12A, a danger zone identifier 13, a communicator 14, an information acquisitor 15, a speed determiner 16, a speed controller 17, and a travel determiner 18.

The travel determiner 18 determines whether traveling in a danger zone is dangerous based on the travel information and the road surface information.

When the travel determiner 18 determines, based on the travel information and the road surface information, that it is dangerous to pass through the danger zone even if the speed of a vehicle comprising the driver assistance device 1A is reduced, the travel determiner 18 sends to the travel route calculator 12A via a bus line BL a determination result that traveling in the danger zone is dangerous.

For example, the travel determiner 18 determines that driving in the danger zone is dangerous when poor visibility in front of the vehicle due to fog is detected based on an analysis of the acquired road surface information.

When a freezing of a road surface at a sharp curve in the danger zone and an activation of a safety device is detected from the travel information of multiple preceding vehicles, the travel determiner 18 determines that driving in the danger zone is dangerous.

The operation of travel determiner 18 is not limited to the above, since the travel determiner 18 simply determines whether traveling in the danger zone is dangerous.

When the travel route calculator 12A receives the determination result from the travel determiner 18 that traveling in the danger zone is dangerous, the travel route calculator 12A calculates a travel route that avoids the danger zone.

In more detail, when the travel route calculator 12A receives the determination result from the travel determiner 18 that traveling in the danger zone is dangerous, the travel route calculator 12A calculates the travel route that avoids the danger zone determined to be dangerous based on current location information and destination information of the vehicle, and stores a calculated travel route in the memory 20.

Process of Driver Assistance Device 1A

The process of the driver assistance device 1A will be described using FIG. 5.

Processor 10A determines whether the vehicle occupant has set a destination (step S210).

When the processor 10A determines that the vehicle occupant has not set the destination ("NO" in step S210), and the process returns to a standby state.

When the processor 10A determines that the vehicle occupant has set the destination ("YES" in step S210), the travel route calculator 12A calculates the travel route from the current location of the vehicle to the destination (step S220), and the process moves to step S230.

The danger zone identifier 13 identifies the danger zone on the travel route calculated in step S220 (step S230), and the process moves to step S240.

The processor 10A determines whether the danger zone has been detected on the travel route by the danger zone identifier 13 (step S240).

When the processor 10A checks the identification results of the danger zone stored in the memory 20 and determines that the danger zone has not been detected by the danger zone identifier 13 ("NO" in step S240), the process is terminated.

When the processor 10A checks the identification results of the danger zone stored in the memory 20 and determines that the danger zone has been detected by the danger zone identifier 13 ("YES" in step S240), the process moves to step S250.

The information acquisitor 15 acquires the travel information and the road surface information from a preceding vehicle traveling ahead of the vehicle on the travel route when traveling in the danger zone (step S250), and the process moves to step S260.

The travel determiner 18 determines whether traveling in the danger zone is dangerous based on the travel information and the road surface information acquired in step S250 (step S260).

When the travel determiner 18 determines that traveling in the danger zone is dangerous ("YES" in step S260), the travel route calculator 12A calculates the travel route that avoids the danger zone (step S270) and the process returns to step S230.

When the travel determiner 18 determines that traveling in the danger zone is not dangerous ("NO" in step S260), the speed determiner 16 determines a safe-travel speed at which the vehicle can travel in the danger zone safely based on the travel information and the road surface information acquired in step S250 (step S280).

The speed controller 17 controls the travel speed of the vehicle in the danger zone based on the safe-travel speed determined in step S280 (step S290), and the process is terminated.

Effect

As described above, the driver assistance device 1A according to the second embodiment comprises the travel determiner 18 configured to determine whether traveling in the danger zone is dangerous based on the travel information and the road surface information. When the travel route calculator 12A receives the determination result from the travel determiner 18 that traveling in the danger zone is dangerous, the travel route calculator 12A calculates the travel route that avoids the danger zone.

In other words, when the travel determiner 18 determines that traveling on the danger zone is dangerous, the travel route calculator 12A recalculates the travel route that avoids the danger zone where traveling is determined to be dangerous.

This allows the driver to travel to the destination on a new travel route that avoids danger, allowing the driver to drive at ease.

When the travel route that avoids the danger zone is calculated by the travel route calculator 12A, the danger zone identifier 13 identifies the danger zone in the new travel route that avoids the danger.

This allows the danger zone to be identified and a speed control to be performed to allow safe travel in the danger zone, allowing the driver to travel at ease, even if the travel route is changed.

Modification 1

Since the process of the speed determiner 16 of the driver assistance devices 1 and 1A according to the embodiments described above uses resources such as the processor 10 capable of high-speed arithmetic process such as an image analysis, and the memory 20 with a large memory size for such arithmetic process, the process may be executed on a server.

For example, the information acquisitor 15 sends the travel information and the road surface information acquired from the preceding vehicle by inter-vehicle communication, to the server. The server determines the safe-travel speed at which the vehicle can travel in the danger zone safely based on information received by the server and sends the safe-travel speed to the speed controller 17.

The server with sufficient resources for high-speed arithmetic process can perform a more accurate information analysis and thus determine with a higher degree of accuracy the safe-travel speed at which the vehicle can travel in the danger zone safely.

This allows a power consumption of processors 10 and 10A and a memory size of the memory 20 to be reduced.

The driver assistance device 1 of the disclosure can be realized by recording, on a recording medium readable by a computer system, the processes of the travel route calculator 12, the danger zone identifier 13, the communicator 14, the information acquisitor 15, the speed determiner 16, the speed controller 17 and other components, described above, and then having the program recorded on this recording medium read into the memory 20 and executed. The computer system as used herein may include an operating system and hardware such as peripheral devices.

In case with a use of a world wide web (WWW) system, the "computer system" also includes an environment that provides and/or displays a website.

The program may be transmitted from the computer system storing the program in the storage device to another computer system, via a transmission medium or by a transmission wave in the transmission medium.

The "transmission medium" through which the program is transmitted refers to a medium having a function of transmitting information. Examples of the transmission medium include a network (communication network) such as the internet and a communication channel (communication line) such as a telephone line.

The program may implement some of the aforementioned functions. Furthermore, the program may be a so-called difference file (difference program) that can implement the aforementioned functions in combination with a program already recorded in the computer system.

Although the embodiments of the disclosure have been described in detail with reference to the drawings, the specific configurations are not limited to these embodiments, and also other designs within a range that does not deviate from the gist of the disclosure may be used.

The invention claimed is:
1. A driver assistance device comprising:
a travel route calculator configured to calculate a travel route to a destination set by an occupant of a vehicle;
a danger zone identifier configured to identify a danger zone on the travel route;
an information acquisitor configured to acquire, from at least one preceding vehicle traveling ahead of the vehicle on the travel route, travel information and road surface information at a time when the at least one preceding vehicle has traveled in the danger zone;
a speed determiner configured to determine, based on the travel information and the road surface information, a safe-travel speed at which the vehicle can travel in the danger zone safely; and a speed controller configured to control, based on the safe-travel speed, a travel speed of the vehicle when the vehicle travels in the danger zone.

2. The driver assistance device according to claim 1, wherein the at least one preceding vehicle is a vehicle other than an emergency vehicle.

3. The driver assistance device according to claim 2, wherein the speed determiner is configured to, upon determining the safe-travel speed, use the travel information and the road surface information of the at least one preceding vehicle that has traveled in the danger zone within a predetermined time before the vehicle reaches the danger zone.

4. The driver assistance device according to claim 3 comprising a travel determiner configured to perform, based on the travel information and the road surface information, determination on whether traveling in the danger zone is dangerous,
   wherein the travel route calculator is configured to calculate a travel route that avoids the danger zone when the travel route calculator has received a result of the determination from the travel determiner that traveling in the danger zone is dangerous.

5. The driver assistance device according to claim 1, wherein the speed determiner is configured to, upon determining the safe-travel speed, use the travel information and the road surface information of the at least one preceding vehicle that has traveled in the danger zone within a predetermined time before the vehicle reaches the danger zone.

6. The driver assistance device according to claim 5 comprising a travel determiner configured to perform, based on the travel information and the road surface information, determination on whether traveling in the danger zone is dangerous,
   wherein the travel route calculator is configured to calculate a travel route that avoids the danger zone when the travel route calculator has received a result of the determination from the travel determiner that traveling in the danger zone is dangerous.

7. A driver assistance device comprising one or more processors and one or more memories communicably connected to the one or more processors, wherein the one or more processors are configured to:
   calculate a travel route to a destination set by an occupant of a vehicle;
   identify a danger zone on the travel route;
   acquire, from at least one preceding vehicle traveling ahead of the vehicle on the travel route, travel information and road surface information at a time when the at least one preceding vehicle has traveled in the danger zone;
   determine, based on the travel information and the road surface information, a safe-travel speed at which the vehicle can travel in the danger zone safely; and
   control, based on the safe-travel speed, a travel speed of the vehicle when the vehicle travels in the danger zone.

* * * * *